US012581375B2

(12) United States Patent　　　　(10) Patent No.: US 12,581,375 B2
Viering et al.　　　　　　　　　　　(45) Date of Patent: Mar. 17, 2026

(54) INTERFERENCE COORDINATION FOR MOBILITY

(71) Applicant: Nokia Technologies Oy, Espoo (FI)

(72) Inventors: Ingo Viering, Munich (DE); Subramanya Chandrashekar, Bangalore (IN); Irina-Mihaela Balan, Munich (DE); Ahmad Awada, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 350 days.

(21) Appl. No.: 18/549,273

(22) PCT Filed: Mar. 8, 2022

(86) PCT No.: PCT/FI2022/050142
§ 371 (c)(1),
(2) Date: Sep. 6, 2023

(87) PCT Pub. No.: WO2022/189701
PCT Pub. Date: Sep. 15, 2022

(65) Prior Publication Data
US 2024/0172058 A1　　May 23, 2024

(30) Foreign Application Priority Data
Mar. 11, 2021　(FI) ..................................... 20215259

(51) Int. Cl.
*H04W 36/18*　　(2009.01)
*H04W 36/00*　　(2009.01)
(52) U.S. Cl.
CPC ...... *H04W 36/0072* (2013.01); *H04W 36/185* (2023.05)

(58) Field of Classification Search
CPC .............................. H04W 36/00; H04W 36/18
See application file for complete search history.

(56) References Cited

U.S. PATENT DOCUMENTS

2012/0115469 A1　5/2012　Chen et al.
2012/0258724 A1　10/2012　Kim et al.
(Continued)

FOREIGN PATENT DOCUMENTS

EP　　2672776 A1　12/2013
EP　　2690909 A2　1/2014
(Continued)

OTHER PUBLICATIONS

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.
(Continued)

*Primary Examiner* — Myron Wyche
(74) *Attorney, Agent, or Firm* — SQUIRE PATTON BOGGS (US) LLP

(57) ABSTRACT

Disclosed is a method for interference coordination for mobility. A first apparatus receives, from a second apparatus, a first interference coordination pattern of the second apparatus. The first apparatus transmits, to the second apparatus, a first handover request for handing over a first terminal device from the first apparatus to the second apparatus. The first apparatus receives, from the second apparatus, a first handover request acknowledgement comprising at least a first handover command. The first apparatus transmits, to the first terminal device, the first handover command based at least partly on the first interference coordination pattern of the second apparatus.

18 Claims, 8 Drawing Sheets

601 Receive interference coordination pattern

602 Transmit handover request

603 Receive handover request acknowledgement

604 Transmit handover command based at least partly on the interference coordination pattern

(56) References Cited

U.S. PATENT DOCUMENTS

| | | |
|---|---|---|
| 2014/0206356 A1 | 7/2014 | Xie |
| 2018/0219655 A1 | 8/2018 | Li |
| 2018/0317148 A1 | 11/2018 | Jin et al. |
| 2019/0394783 A1 | 12/2019 | Byun et al. |
| 2021/0029605 A1 | 1/2021 | Kadiri et al. |

FOREIGN PATENT DOCUMENTS

| | | | | |
|---|---|---|---|---|
| EP | 2757848 A1 | 7/2014 | | |
| EP | 2800412 A1 | 11/2014 | | |
| EP | 2690909 B1 * | 9/2017 | ............ | H04J 11/005 |
| EP | 3651529 A1 | 5/2020 | | |
| WO | 2012/151426 A1 | 11/2012 | | |
| WO | 2013/055430 A1 | 4/2013 | | |

OTHER PUBLICATIONS

"3rd Generation Partnership Project; Technical Specification Group Radio Access Network; NG-RAN; F1 application protocol (F1AP) (Release 16)", 3GPP TS 38.473, V16.1.0, Mar. 2020, pp. 1-240.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"Msc-generator", Sourceforge, Retrieved on Oct. 4, 2023, Webpage available at : https://sourceforge.net/projects/msc-generator/.

"Report of [105#57][LTE/feMOB] UE and network side impacts of single/dual protocol stacks", 3GPP TSG RAN WG2 Meeting #105bis, R2-1904255, Agenda: 12.3.2.1, ZTE Corporation, Apr. 8-12, 2019, pp. 1-34.

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.1.0, Mar. 2020, pp. 1-438.

"RRC diversity", 3GPP TSG-RAN WG2 #95bis, R2-166776, Agenda: 9.2.2.3, Ericsson, Oct. 10-14, 2016, pp. 1-3.

Martikainen et al., "On the Basics of Conditional Handover for 5G Mobility", IEEE 29th Annual International Symposium on Personal, Indoor and Mobile Radio Communications (PIMRC), Sep. 9-12, 2018, 7 pages.

Ezzaouia et al., "Autonomous and dynamic inter-cell interference coordination techniques for future wireless networks", IEEE 13th International Conference on Wireless and Mobile Computing, Networking and Communications (WiMob), Oct. 9-11, 2017, 8 pages.

Office action received for corresponding Finnish Patent Application No. 20215259, dated Sep. 7, 2021, 8 pages.

Office action received for corresponding Finnish Patent Application No. 20215259, dated Feb. 11, 2022, 6 pages.

International Search Report and Written Opinion received for corresponding Patent Cooperation Treaty Application No. PCT/FI2022/050142, dated May 30, 2022, 15 pages.

Extended European Search Report received for corresponding European Patent Application No. 22766436.4, dated Dec. 13, 2024, 13 pages.

"UL TDM aspects of enhanced MBB HO using Dual Active Protocol Stack", 3GPP TSG-RAN WG2 Meeting #107, R2-1909848, Agenda: 12.3.2.1, Qualcomm Incorporated, Aug. 26-30, 2019, 8 pages.

"Reuse MR-DC Backhaul Coordination in MBB Handover", 3GPP TSG-RAN WG3 #105, R3-193568, Agenda: 15.2.2, Qualcomm Incorporated, May 13-17, 2019, 4 pages.

"Non-UE associated signaling Hic", 3GPP TSG-RAN WG3 Meeting #98, R3-174623, Vivo, Nov. 27-Dec. 1, 2017, 9 pages.

Office action received for corresponding Indian Patent Application No. 202347062712, dated Dec. 20, 2024, 7 pages.

* cited by examiner

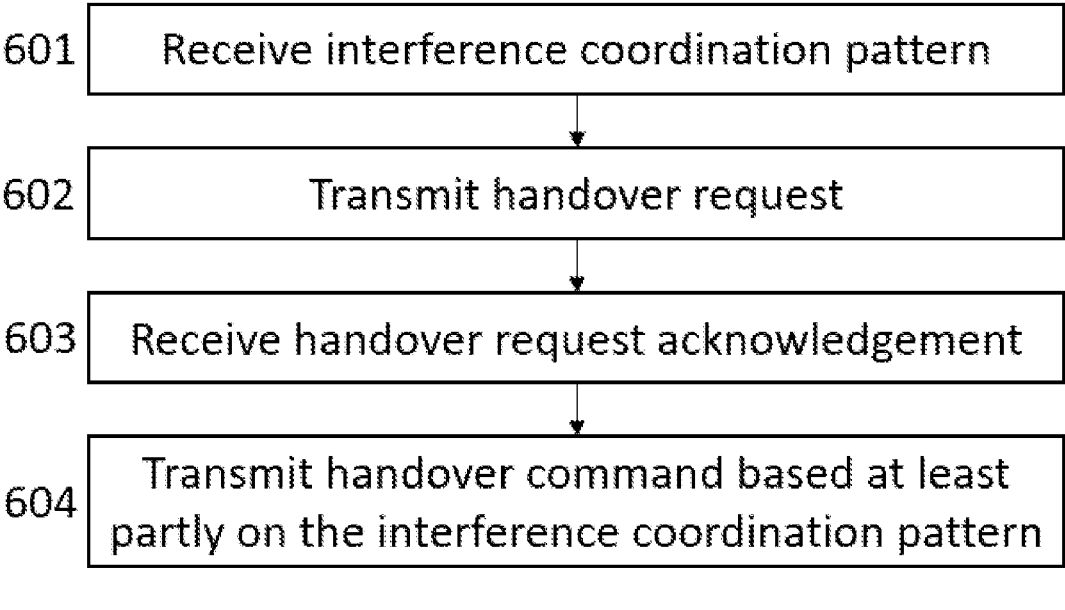

| 601 | Receive interference coordination pattern |
| 602 | Transmit handover request |
| 603 | Receive handover request acknowledgement |
| 604 | Transmit handover command based at least partly on the interference coordination pattern |

FIG. 6

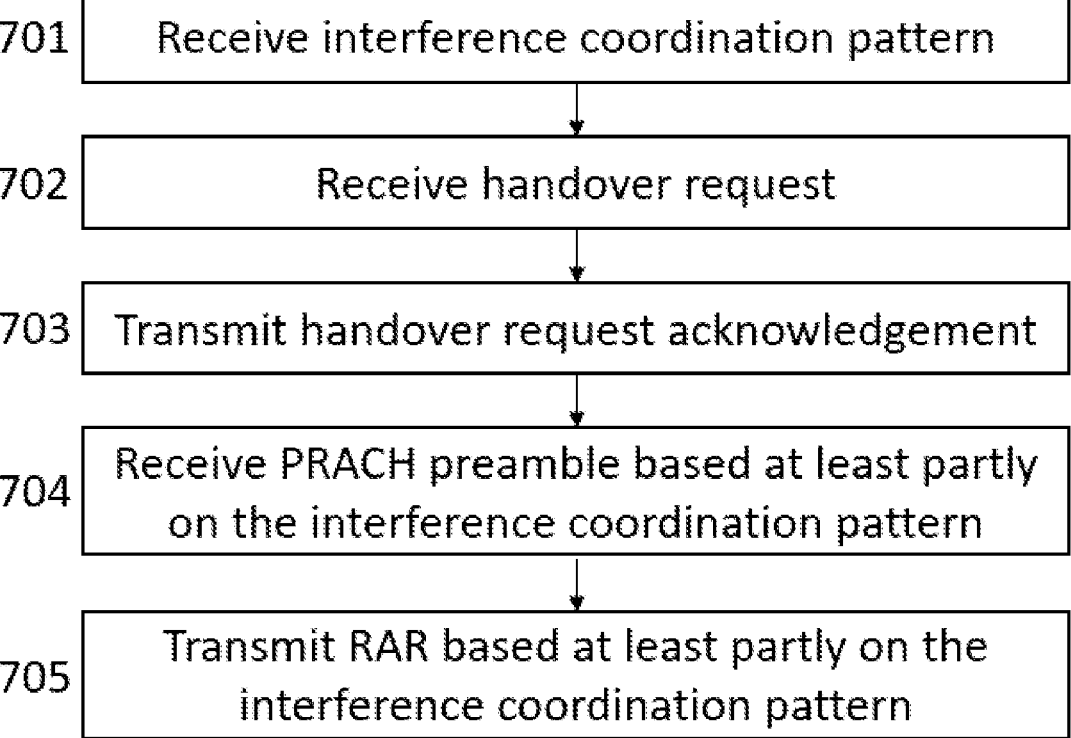

| 701 | Receive interference coordination pattern |
| 702 | Receive handover request |
| 703 | Transmit handover request acknowledgement |
| 704 | Receive PRACH preamble based at least partly on the interference coordination pattern |
| 705 | Transmit RAR based at least partly on the interference coordination pattern |

FIG. 7

801   Receive interference coordination pattern

802   Transmit PRACH preamble based at least partly on the interference coordination pattern 803   Receive RAR based at least partly on the interference coordination pattern

900

1000

INTERFERENCE COORDINATION FOR MOBILITY

RELATED APPLICATIONS

This application claims priority to PCT Patent Application No. PCT/FI2022/050142, filed Mar. 8, 2022, and entitled "INTERFERENCE COORDINATION FOR MOBILITY", and to Finnish Patent Application No. 20215259, filed Mar. 11, 2021, and entitled "INTERFERENCE COORDINA-TION FOR MOBILITY", each of which are incorporated herein by reference in their entirety.

FIELD

The following exemplary embodiments relate to wireless communication.

BACKGROUND

In a handover procedure, a cellular transmission may be transferred from one base station to another. However, if the handover is not timed appropriately, it may lead to a negative impact on the quality of the cellular transmission. Therefore, it is desirable to provide an improved handover procedure.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided a first apparatus comprising at least one processor, and at least one memory including computer program code, wherein the at least one memory and the computer program code are configured, with the at least one processor, to cause the first apparatus to: receive, from a second apparatus, a first interference coor-dination pattern of the second apparatus; transmit, to the second apparatus, a first handover request for handing over a first terminal device from the first apparatus to the second apparatus; receive, from the second apparatus, a first han-dover request acknowledgement comprising at least a first handover command; and transmit, to the first terminal device, the first handover command based at least partly on the first interference coordination pattern of the second apparatus.

According to another aspect, there is provided a first apparatus comprising means for: receiving, from a second apparatus, a first interference coordination pattern of the second apparatus; transmitting, to the second apparatus, a first handover request for handing over a first terminal device from the first apparatus to the second apparatus; receiving, from the second apparatus, a first handover request acknowledgement comprising at least a first han-dover command; and transmitting, to the first terminal device, the first handover command based at least partly on the first interference coordination pattern of the second apparatus.

According to another aspect, there is provided a method comprising: receiving, by a first apparatus, from a second apparatus, a first interference coordination pattern of the second apparatus; transmitting, by the first apparatus, to the second apparatus, a first handover request for handing over a first terminal device from the first apparatus to the second apparatus; receiving, by the first apparatus, from the second apparatus, a first handover request acknowledgement com-prising at least a first handover command; and transmitting, by the first apparatus, to the first terminal device, the first handover command based at least partly on the first inter-ference coordination pattern of the second apparatus.

According to another aspect, there is provided a computer program comprising instructions for causing a first apparatus to perform at least the following: receive, from a second apparatus, a first interference coordination pattern of the second apparatus; transmit, to the second apparatus, a first handover request for handing over a first terminal device from the first apparatus to the second apparatus; receive, from the second apparatus, a first handover request acknowl-edgement comprising at least a first handover command; and transmit, to the first terminal device, the first handover command based at least partly on the first interference coordination pattern of the second apparatus.

According to another aspect, there is provided a computer readable medium comprising program instructions for caus-ing a first apparatus to perform at least the following: receive, from a second apparatus, a first interference coor-dination pattern of the second apparatus; transmit, to the second apparatus, a first handover request for handing over a first terminal device from the first apparatus to the second apparatus; receive, from the second apparatus, a first han-dover request acknowledgement comprising at least a first handover command; and transmit, to the first terminal device, the first handover command based at least partly on the first interference coordination pattern of the second apparatus.

According to another aspect, there is provided a non-transitory computer readable medium comprising program instructions for causing a first apparatus to perform at least the following: receive, from a second apparatus, a first interference coordination pattern of the second apparatus; transmit, to the second apparatus, a first handover request for handing over a first terminal device from the first apparatus to the second apparatus; receive, from the second apparatus, a first handover request acknowledgement comprising at least a first handover command; and transmit, to the first terminal device, the first handover command based at least partly on the first interference coordination pattern of the second apparatus.

According to another aspect, there is provided a second apparatus comprising at least one processor, and at least one memory including computer program code, wherein the at least one memory and the computer program code are configured, with the at least one processor, to cause the second apparatus to: receive, from a first apparatus, a first interference coordination pattern of the first apparatus; receive, from the first apparatus, a first handover request for handing over a first terminal device from the first apparatus to the second apparatus; transmit, to the first apparatus, a first handover request acknowledgement comprising at least a first handover command; and transmit, to the first terminal device, a random access response based at least partly on the first interference coordination pattern of the first apparatus.

According to another aspect, there is provided a second apparatus comprising means for: receiving, from a first apparatus, a first interference coordination pattern of the first apparatus; receiving, from the first apparatus, a first han-dover request for handing over a first terminal device from the first apparatus to the second apparatus; transmitting, to the first apparatus, a first handover request acknowledge-ment comprising at least a first handover command; and transmitting, to the first terminal device, a random access response based at least partly on the first interference coordination pattern of the first apparatus.

According to another aspect, there is provided a method comprising: receiving, by a second apparatus, from a first apparatus, a first interference coordination pattern of the first apparatus; receiving, by the second apparatus, from the first apparatus, a first handover request for handing over a first terminal device from the first apparatus to the second apparatus; transmitting, by the second apparatus, to the first apparatus, a first handover request acknowledgement comprising at least a first handover command; and transmitting, by the second apparatus, to the first terminal device, a random access response based at least partly on the first interference coordination pattern of the first apparatus.

According to another aspect, there is provided a computer program comprising instructions for causing a second apparatus to perform at least the following: receive, from a first apparatus, a first interference coordination pattern of the first apparatus; receive, from the first apparatus, a first handover request for handing over a first terminal device from the first apparatus to the second apparatus; transmit, to the first apparatus, a first handover request acknowledgement comprising at least a first handover command; and transmit, to the first terminal device, a random access response based at least partly on the first interference coordination pattern of the first apparatus.

According to another aspect, there is provided a computer readable medium comprising program instructions for causing a second apparatus to perform at least the following: receive, from a first apparatus, a first interference coordination pattern of the first apparatus; receive, from the first apparatus, a first handover request for handing over a first terminal device from the first apparatus to the second apparatus; transmit, to the first apparatus, a first handover request acknowledgement comprising at least a first handover command; and transmit, to the first terminal device, a random access response based at least partly on the first interference coordination pattern of the first apparatus.

According to another aspect, there is provided a non-transitory computer readable medium comprising program instructions for causing a second apparatus to perform at least the following: receive, from a first apparatus, a first interference coordination pattern of the first apparatus; receive, from the first apparatus, a first handover request for handing over a first terminal device from the first apparatus to the second apparatus; transmit, to the first apparatus, a first handover request acknowledgement comprising at least a first handover command; and transmit, to the first terminal device, a random access response based at least partly on the first interference coordination pattern of the first apparatus.

According to another aspect, there is provided a third apparatus comprising at least one processor, and at least one memory including computer program code, wherein the at least one memory and the computer program code are configured, with the at least one processor, to cause the third apparatus to: transmit, to a second apparatus, a physical random access channel preamble based at least partly on a first interference coordination pattern of a first apparatus; wherein the third apparatus is comprised in a terminal device.

According to another aspect, there is provided a third apparatus comprising means for: transmitting, to a second apparatus, a physical random access channel preamble based at least partly on a first interference coordination pattern of a first apparatus; wherein the third apparatus is comprised in a terminal device.

According to another aspect, there is provided a method comprising: transmitting, by a terminal device, to a second apparatus, a physical random access channel preamble based at least partly on a first interference coordination pattern of a first apparatus.

According to another aspect, there is provided a computer program comprising instructions for causing a third apparatus to perform at least the following: transmit, to a second apparatus, a physical random access channel preamble based at least partly on a first interference coordination pattern of a first apparatus; wherein the third apparatus is comprised in a terminal device.

According to another aspect, there is provided a computer readable medium comprising program instructions for causing a third apparatus to perform at least the following: transmit, to a second apparatus, a physical random access channel preamble based at least partly on a first interference coordination pattern of a first apparatus; wherein the third apparatus is comprised in a terminal device.

According to another aspect, there is provided a non-transitory computer readable medium comprising program instructions for causing a third apparatus to perform at least the following: transmit, to a second apparatus, a physical random access channel preamble based at least partly on a first interference coordination pattern of a first apparatus; wherein the third apparatus is comprised in a terminal device.

According to another aspect, there is provided a system comprising at least a first base station, a second base station, and a first terminal device. The first base station is configured to: receive, from the second base station, a first interference coordination pattern of the second base station; transmit, to the second base station, a second interference coordination pattern of the first base station; transmit, to the second base station, a first handover request for handing over the first terminal device from the first base station to the second base station; receive, from the second base station, a first handover request acknowledgement comprising at least a first handover command; and transmit, to the first terminal device, the first handover command based at least partly on the first interference coordination pattern of the second base station. The second base station is configured to: transmit, to the first base station, the first interference coordination pattern of the second base station; receive, from the first base station, the second interference coordination pattern of the first base station; receive, from the first base station, the first handover request for handing over the first terminal device from the first base station to the second base station; transmit, to the first base station, the first handover request acknowledgement comprising at least the first handover command; and transmit, to the first terminal device, a random access response based at least partly on the second interference coordination pattern of the first base station.

According to another aspect, there is provided a system comprising at least a first base station, a second base station, and a first terminal device. The first base station comprises means for: receiving, from the second base station, a first interference coordination pattern of the second base station; transmitting, to the second base station, a second interference coordination pattern of the first base station; transmitting, to the second base station, a first handover request for handing over the first terminal device from the first base station to the second base station; receiving, from the second base station, a first handover request acknowledgement comprising at least a first handover command; and transmitting, to the first terminal device, the first handover command based at least partly on the first interference coordination pattern of the second base station. The second base station comprises means for: transmitting, to the first base station, the first interference coordination pattern of the second base station; receiving, from the first base station, the second interference coordination pattern of the first base station; receiving, from the first base station, the first handover request for handing over the first terminal device from the first base station to the second base station; transmitting, to the first base station, the first handover request acknowledgement comprising at least the first handover command; and transmitting, to the first terminal device, a random access response based at least partly on the second interference coordination pattern of the first base station.

BRIEF DESCRIPTION OF THE DRAWINGS

In the following, various exemplary embodiments will be described in greater detail with reference to the accompanying drawings, in which

FIGS. 6-8 illustrate flow charts according to some exemplary embodiments;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
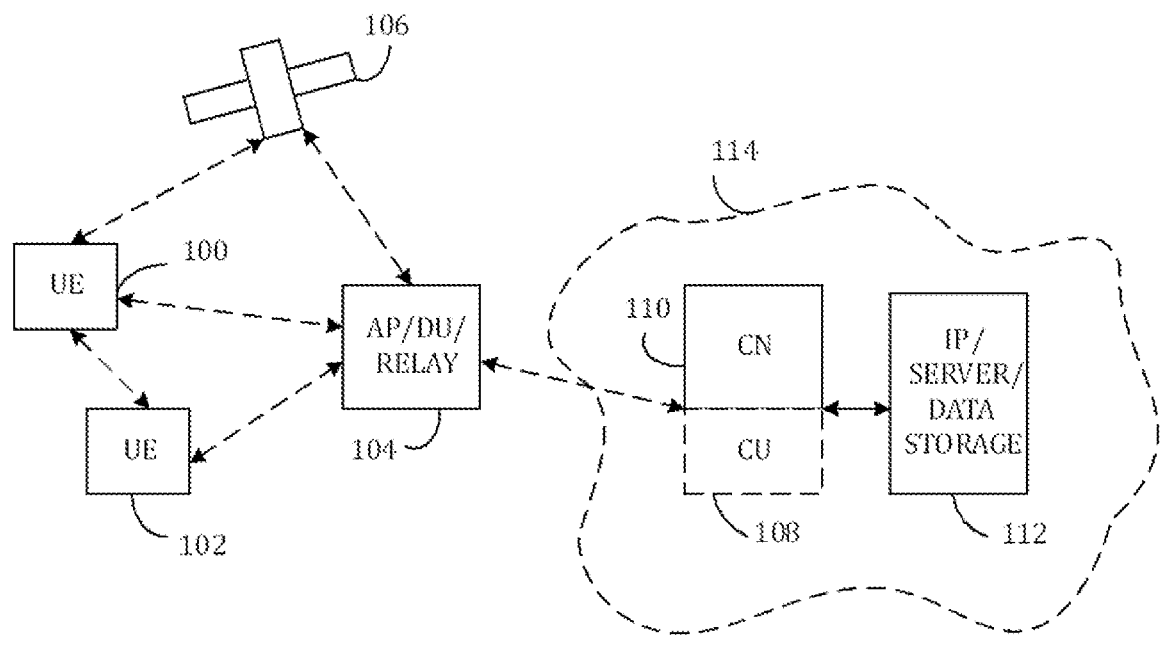
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IOT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a centralized unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IOT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); a distributed unit (DU) that may be used for the so-called Layer 1 (L1) processing and real-time Layer 2 (L2) processing; and a centralized unit (CU) or a central unit that may be used for non-real-time L2 and Layer 3 (L3) processing. Such a split may enable the centralization of CUs relative to the cell sites and DUs, whereas DUs may be more distributed and may even remain at cell sites. The CU and DU together may also be referred to as baseband or a baseband unit (BBU). The RU and DU may also be comprised into a radio access point (RAP). Cloud computing platforms may also be used to run the CU or DU. The CU may run in a cloud computing platform (vCU, virtualized CU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

To provide a continuous service for the user of a moving UE, the UE may carry out a handover procedure, which may also be referred to as handoff, to change from one base station to another. For example, when a UE with an ongoing call or data session is moving away from an area covered by a source cell and entering an area covered by a neighbor cell, the session may be handed over from the base station of the source cell to the base station of the neighbor cell in order to avoid terminating or interrupting the session, when the UE gets outside the range of the source cell.

Figure 2:
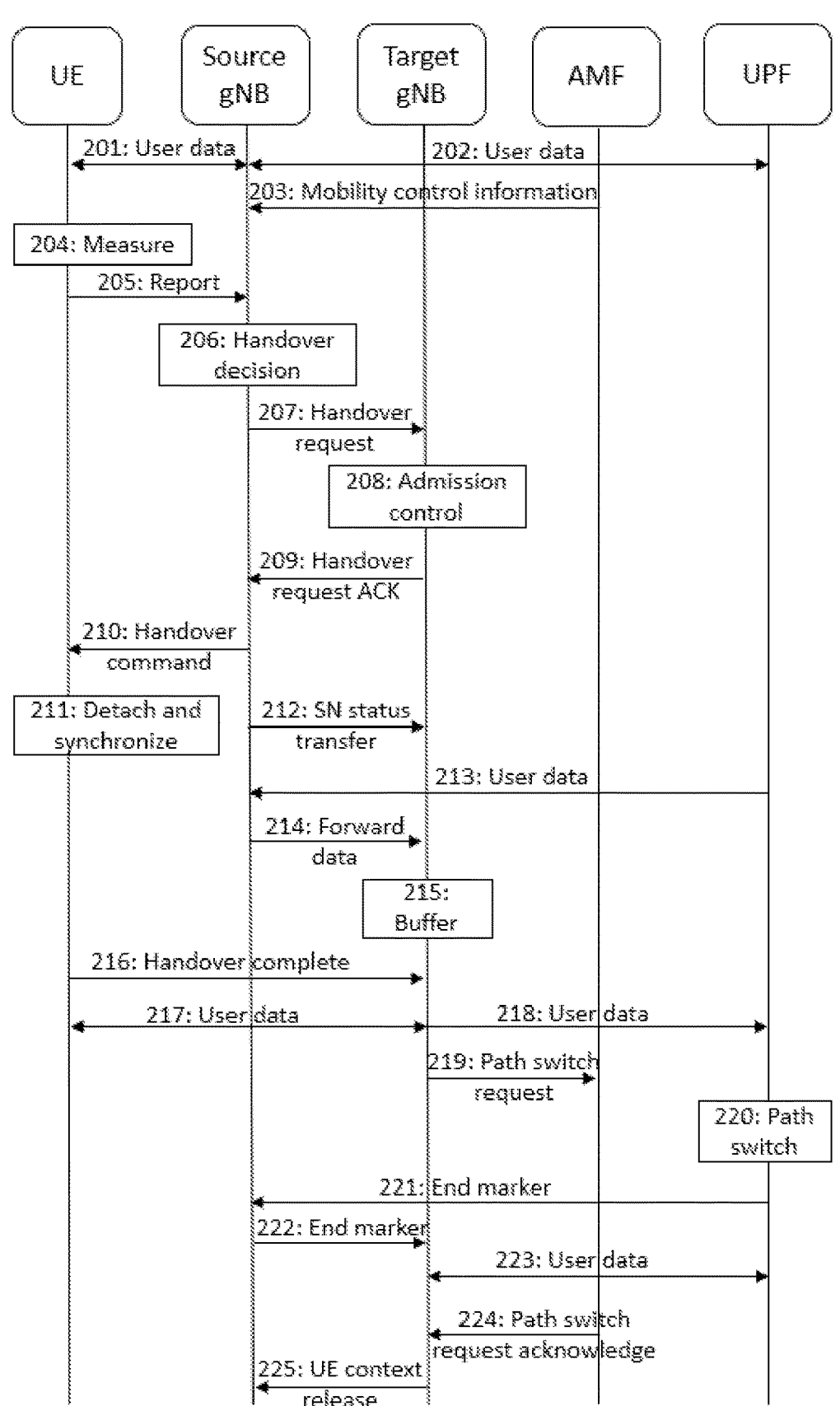
FIG. 2 illustrates a signaling diagram according to a baseline handover procedure.

FIG. 2 illustrates a legacy handover procedure, which may also be referred to as a baseline handover procedure. A UE exchanges 201 uplink/downlink user data with a source gNB that is currently serving the UE. The source gNB exchanges 202 user data with a user plane function (UPF). An access and mobility management function (AMF) transmits 203 mobility control information to the source gNB. The mobility control information may comprise the UE context within the source gNB containing information regarding roaming and access restrictions, which were provided either at connection establishment or at the last timing advance update.

The UE measures 204 for example the signal strength of the serving cell associated with the source gNB, as well as the signal strength of one or more neighboring cells. The UE measurement procedures may be configured by the source gNB. In order to have stable measurements of the serving cell, the UE may apply averaging to the measurements, for example the so-called Layer 3 filtering. This averaging may cause some delay to the measurements. If the signal strength of the serving cell degrades and/or the neighboring (non-serving) cells get stronger, this may manifest in the measurements with some delay. That is, the degradation of the serving cell may already be worse than the measurements indicate. If a certain measurement condition is fulfilled, for example a neighbor measurement is 3 decibels (dB) stronger than the serving cell for a certain period of time, i.e. time-to-trigger, the UE transmits 205 a measurement report to the source gNB. It should be noted that the time-to-trigger may impose an additional delay to the knowledge on the gNB side. Despite the imposed delay, both averaging/Layer 3 filtering and time-to-trigger may be necessary to provide stable measurements and solid measurement reports. Shortening these values may lead to decreased measurement accuracy and bad mobility decisions.

Once the source gNB receives the measurement report from the UE, the source gNB decides 206 to initiate a handover for switching the UE from the source gNB to a target gNB associated with a neighbor cell, i.e. a target cell. The source gNB transmits 207 a handover request to the target gNB comprising information for preparing the handover at the target gNB. The target gNB runs 208 admission control, and transmits 209 a handover request acknowledgement (ACK) message to the source gNB, if the target gNB accepts the handover. The handover request acknowledgement message comprises a handover command to be sent to the UE.

The source gNB transmits 210 the handover command to the UE as a radio resource control (RRC) reconfiguration message comprising information for accessing the target cell, such as the target cell identifier. It should be noted that this signaling may fail, if the UE is already experiencing high interference from the target gNB, for example due to the averaging delay, time-to-trigger, and the handover preparation in the previous steps. A possible root cause for mobility failures is that the handover command is not received by the UE, which may experience a radio link failure in this case.

If the UE successfully receives the handover command, the UE detaches 211 from the source gNB, synchronizes to the target gNB, and starts a random access channel (RACH) procedure. A stable radio connection to the target gNB may be needed for the RACH procedure. As a consequence, the previous procedures cannot be done arbitrarily early to ensure a safe handover command, since the RACH procedure may not be successful if the procedures happen too early, i.e. when the source cell is still producing high interference.

The source gNB transmits 212 a sequence number (SN) status transfer message to the target gNB. SN status transfer informs the target gNB about which packets have been successfully transmitted or received by the source gNB. The UPF transmits 213 user data to the source gNB, and the source gNB forwards 214 the user data received from the UPF as well as buffered user data to the target gNB. The target gNB buffers 215 the user data received from the source gNB. The UE transmits 216 a handover complete message, i.e. an RRC reconfiguration complete message, to the target gNB to complete the RRC handover procedure.

The UE transmits 217 user data to the target gNB, and the target gNB transmits 218 the received user data to the UPF. The target gNB transmits 219 a path switch request to the AMF to switch the downlink data path towards the target gNB. The UPF performs 220 the path switch to switch the downlink data path towards the target gNB. The UPF transmits 221 one or more end marker packets to the source gNB to release any user plane resources towards the source gNB. The source gNB forwards 222 the one or more end marker packets to the target gNB. The target gNB exchanges 223 user data with the UPF. The AMF confirms the path switch request message by transmitting 224 a path switch request acknowledgement message to the target gNB. The target gNB transmits 225 a UE context release message to the source gNB indicating a successful handover.

Based on the above, mobility robustness can be improved by improving the signal quality for the handover command, and by improving the signal quality during the RACH procedure. Improving the signal quality for the handover command and the radio link of the target gNB during random access may also be beneficial for other handover procedures, such as the make-before-break (MBB) handover and the dual active protocol stack (DAPS) handover.

MBB is similar to the legacy handover procedure described above, except that the UE does not detach from the source cell until it completes the decoding and processing of the target cell configuration received in the handover command. During this decoding and processing time, the UE can still receive and transmit user plane packets to the source cell before performing the first Physical RACH (PRACH) transmission to the target cell, which decreases the interruption time by the RRC procedure delay accounting for the decoding of the target cell configuration and the UE processing time that is needed before performing the random access.

Figure 3:
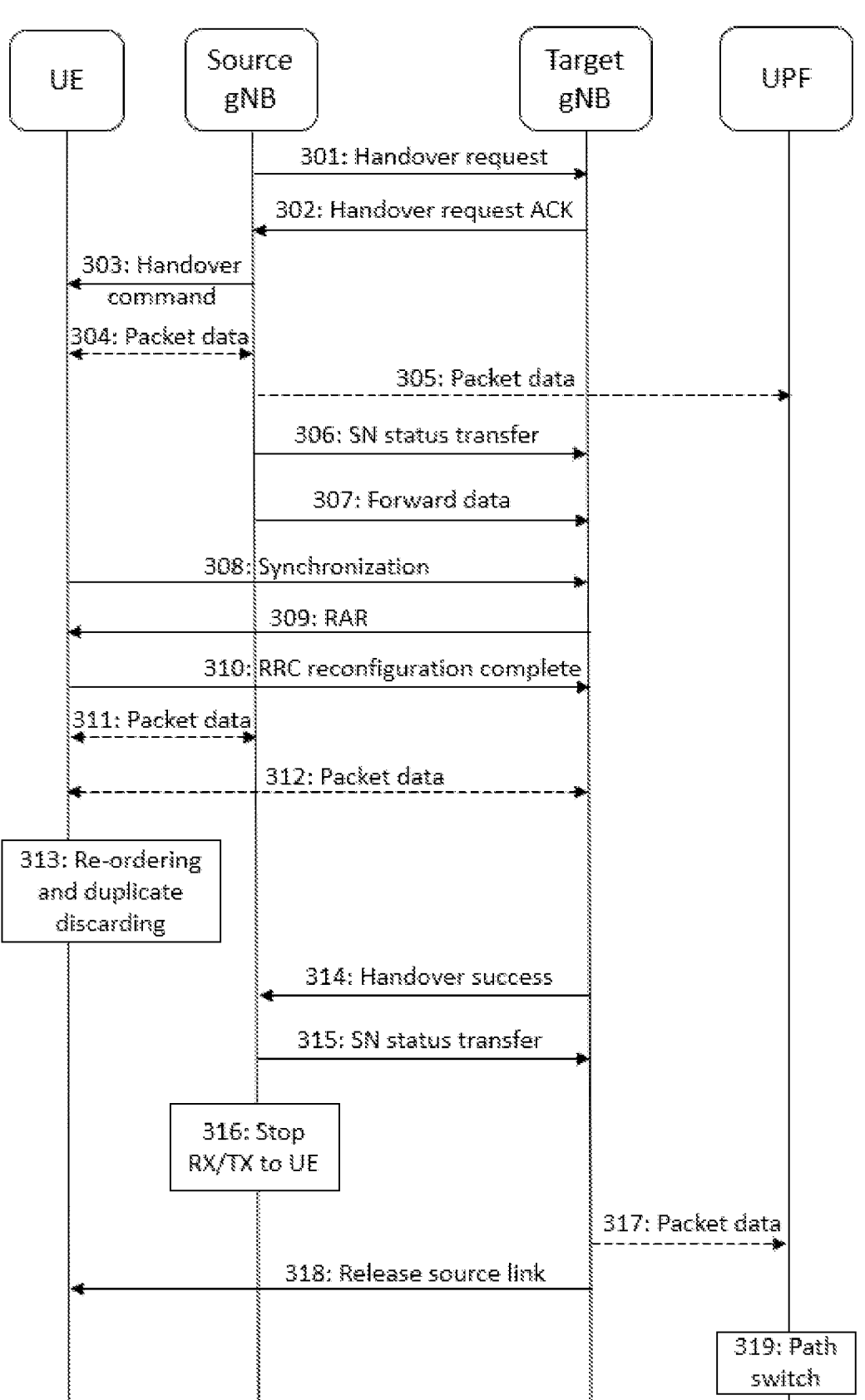
FIG. 3 illustrates a signaling diagram according to a dual active protocol stack handover procedure.

The DAPS procedure may achieve 0 ms interruption time in downlink (DL) and close to 0 ms in uplink (UL). FIG. 3 illustrates the DAPS handover procedure. Herein, both the source gNB and the target gNB has a full Layer 2 (L2) protocol stack with its own security key for ciphering and deciphering of the packet data convergence protocol (PDCP) service data units (SDUs). To avoid a hard handover causing service interruption, the UE should establish a new radio link with respect to the target cell before detaching the radio link of the source cell. In other words, for some time before releasing the source cell, the UE would be exchanging data with both the source cell and the target cell.

Referring to FIG. 3, the source gNB, which is currently serving the UE, transmits 301 a handover request to the target gNB comprising information for preparing the handover at the target gNB. The target gNB prepares for the handover and transmits 302 a handover request acknowledgement (ACK) message to the source gNB to indicate acceptance of the handover. The handover request acknowledgement message comprises a handover command to be sent to the UE. The source gNB transmits 303 the handover command to the UE as an RRC reconfiguration message.

After receiving the handover command, the UE continues to exchange 304, i.e. receive and transmit, packet data with the source gNB, and the source gNB forwards 305 the packet data to the UPF. The source gNB transmits 306 an early SN status transfer message to the target gNB, and forwards 307 the packet data to the target gNB.

While receiving/transmitting data from/to the source gNB, the UE performs the random access procedure to the target gNB by synchronizing 308 to the target gNB, to which the target gNB responds by transmitting 309 a random-access response (RAR) to the UE, and the UE then transmits 310 an RRC reconfiguration complete message to the target gNB to complete the RRC handover procedure.

The UE is still exchanging 311, 312 packet data with both the source gNB and the target gNB. The UE performs 313 re-ordering and duplicate discarding. The target gNB transmits 314 a handover success message to the source gNB indicating the successful handover execution. Having received the handover success message, the source gNB transmits 315 an SN status transfer message to the target gNB, and the source gNB stops 316 its transmission/reception to the UE. The target gNB forwards 317 the packet data received from the UE to the UPF. The target gNB releases 318 the source link between the UE and the source gNB. The UPF performs 319 a path switch.

For example, for DAPS handover targeting close to 0 ms interruption time on the user plane, it may be necessary that the UE can still receive/transmit user plane data from/to the source cell to avoid any outage for the UE. For instance, outage may occur if the UE fails to receive or transmit the user plane packets while performing simultaneous random access to the target cell. Improving the signal quality of the source cell after sending the handover command may reduce the likelihood of outage in the source cell.

Some exemplary embodiments may provide an interference coordination mechanism to protect the mobility signaling and user plane (in case of DAPS). The interference coordination may be initiated during the handover preparation, for example during the handover request and the handover request acknowledgement. Furthermore, the interference coordination may be temporary such that the validity of the coordination is limited in time to the duration of the handover, and the interference coordination stops when the handover is completed.

Figure 4:
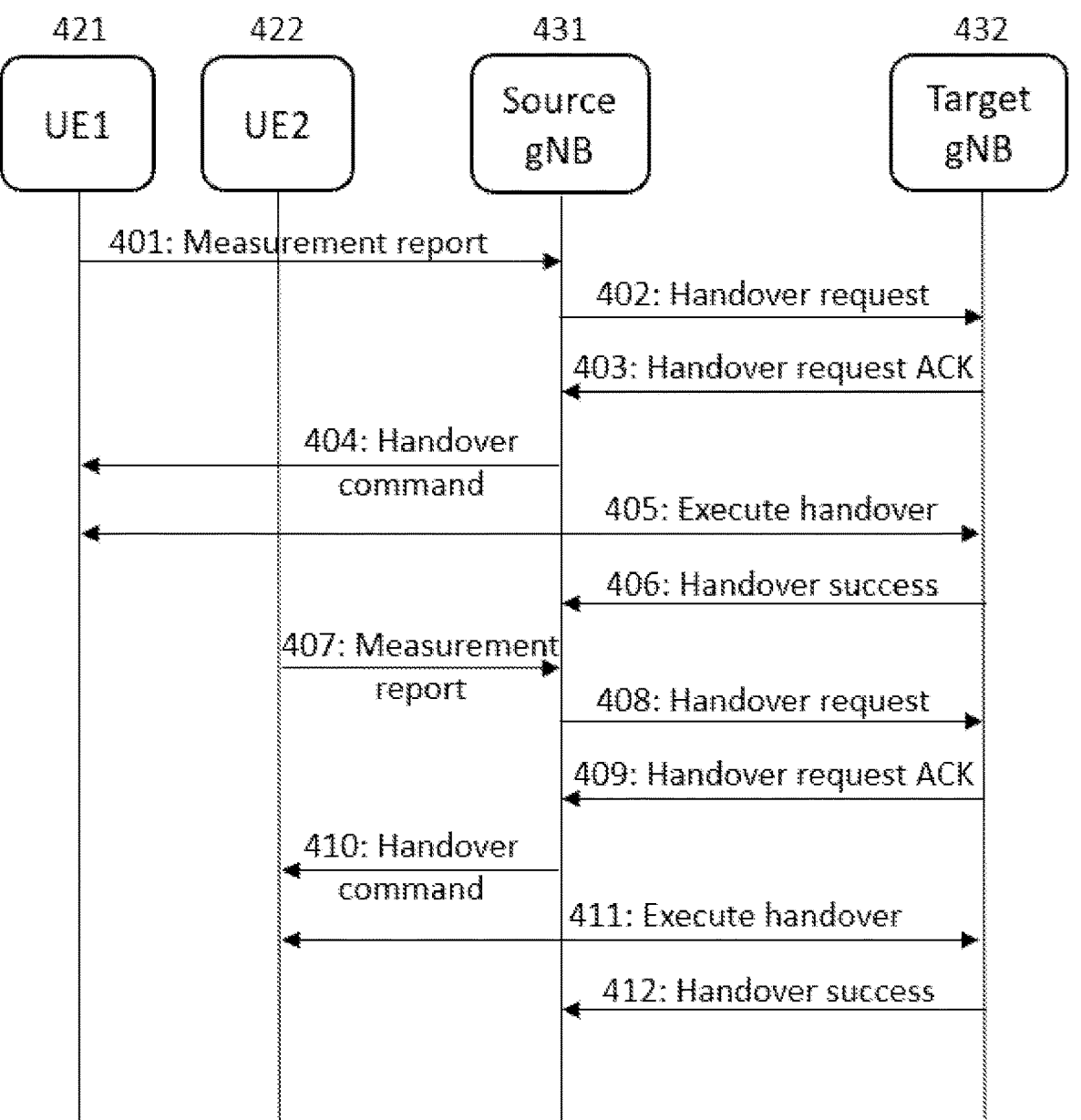
FIGS. 4 and 5 illustrate signaling diagrams according to some exemplary embodiments.

FIG. 4 illustrates a signaling diagram according to an exemplary embodiment. In this exemplary embodiment, the target cell provides an interference coordination pattern, at least on downlink, to the source cell during the handover request acknowledgement, and the source cell may schedule the signaling for the UE (for example handover command, conditional handover configuration, and/or general RRC reconfiguration) or user plane packets while the UE is performing random access to the target cell in a DAPS handover, such that the signaling and/or user plane transmission benefits from the coordination. Furthermore, the source cell may provide an interference coordination pattern, on uplink and downlink, to the target cell during the handover request message, and the target cell may schedule RACH signaling, including RACH response, such that the signaling benefits from the coordination. For example, an interference coordination pattern may comprise a time coordination pattern in order for the source cell and target cell to use different subframes for transmission and reception, and/or a frequency coordination pattern in order for the source cell and target cell to use different frequency chunks for transmission and reception.

Referring to FIG. 4, a first UE 421 transmits 401 a first measurement report to a source base station 431, i.e. the current serving cell of the first UE. The source base station may be a gNB, for example. The source base station may also be referred to as a first base station or a source cell herein. The first measurement report may comprise, for example, a set of signal strength measurements of the serving cell and one or more neighboring cells measured by the first UE. The set of measurements may comprise, for example, signal-to-noise ratio (SNR), signal-to-interference-plus-noise ratio (SINR), reference signal received power (RSRP), and/or reference signal received quality (RSRQ).

Once the source base station receives the first measurement report from the first UE, the source base station decides, based at least partly on the first measurement report, to initiate a handover for handing over the first UE from the source base station to a target base station 432, i.e. a neighbor cell. The target base station may be a gNB, for example. The target base station may also be referred to as a second base station or a target cell herein. The source base station transmits 402 a first handover request to the target base station, wherein the first handover request may comprise at least a first interference coordination pattern of the source base station as well as information for preparing the handover at the target base station. The first handover request may also comprise a request to the target base station to provide a second interference coordination pattern of the target base station to the source base station. The target base station transmits 403 a first handover request acknowledgement message to the source base station to accept the handover. The first handover request acknowledgement message comprises at least a first handover command to be sent to the first UE, as well as the second interference coordination pattern of the target base station.

The source base station transmits 404 the first handover command to the first UE as an RRC reconfiguration message comprising information, such as the target cell identifier, for accessing the target base station. The first handover command is transmitted based at least partly on the second interference coordination pattern. In other words, the first handover command may be scheduled in radio frames, subframe, slots or frequency chunks where the target base station is not transmitting user plane data to its UEs, or where the target base station is transmitting with low power such that the first handover command is received by the first UE with little inter-cell interference caused by the target cell.

A handover is then executed 405 to hand over the first UE from the source base station to the target base station. The handover 405 may be performed, for example, according to the baseline handover procedure described above with reference to FIG. 2, or according to the DAPS handover procedure described above with reference to FIG. 3. In case of DAPS handover, the user plane data of the source cell may be scheduled in radio frames, subframe, slots or frequency chunks where the target cell is not transmitting user plane data to its UEs, or where the target cell is transmitting with low power such that user plane packets are received by the UEs with little inter-cell interference caused by the target cell.

The random access of the UE to the target cell, which is part of the handover execution 405, is performed based at least partly on the first interference coordination pattern. In other words, the PRACH preamble transmission may be scheduled in radio frames, subframe, slots or frequency chunks where the source cell is not scheduling its UEs for uplink transmissions, such that the PRACH preamble is received by the target cell with little uplink interference caused by the UEs of the source cell. Similarly, the target cell may schedule the RAR in radio frames, subframe, slots or frequency chunks where the source cell is not transmitting user plane data to its UEs, or where the source cell is transmitting with low power such that the RAR is received by the UE with little inter-cell interference caused by the source cell.

The target base station transmits 406 a first handover success message to the source base station to indicate the successful handover execution for the first UE, and to instruct the source base station to deactivate the first interference coordination pattern, i.e. to stop using interference coordination.

A second UE 422 transmits 407 a second measurement report to the source base station, i.e. the current serving cell of the second UE. The second measurement report may comprise, for example, a set of signal strength measurements of the serving cell and one or more neighboring cells measured by the second UE. The set of measurements may comprise, for example, SNR, SINR, RSRP, and/or RSRQ.

Once the source base station receives the second measurement report from the second UE, the source base station decides, based at least partly on the second measurement report, to initiate a handover for handing over the second UE from the source base station to the target base station. The source base station transmits 408 a second handover request to the target base station, wherein the second handover request may comprise at least a third interference coordination pattern of the source base station. The target base station transmits 409 a second handover request acknowledgement message to the source base station. The second handover request acknowledgement message comprises at least a second handover command to be sent to the second UE, as well as a fourth interference coordination pattern of the target base station.

The source base station transmits 410 the second handover command to the second UE as an RRC reconfiguration message comprising information, such as the target cell identifier, for accessing the target base station. The second handover command is transmitted based at least partly on the fourth interference coordination pattern of the target base station.

A handover is then executed 411 to hand over the second UE from the source base station to the target base station. The handover execution 411 may be performed, for example, according to the baseline handover procedure described above with reference to FIG. 2, or according to the DAPS handover procedure described above with reference to FIG. 3. In case of DAPS handover, the user plane data originating from the source base station is transmitted based at least partly on the fourth interference coordination pattern of the target base station.

Similarly, as part of the handover execution 411, the PRACH preamble and the RAR are transmitted and received, respectively, by the second UE based at least partly on the third interference coordination pattern of the source base station.

The target base station transmits 412 a second handover success message to the source base station to indicate the successful handover execution for the second UE.

In another exemplary embodiment, having exchanged the interference coordination patterns between the source and target cell for the first UE that is handed over, the source and target cell may re-activate the previously exchanged patterns for one or more other UEs (for example the second UE) during the handover preparation. This would spare the exchange of patterns during the handover preparation for the other UE(s). In other words, in this exemplary embodiment, the interference coordination patterns may be exchanged just once, even if there are multiple UEs that are handed over. The source cell and the target cell of the handover may then just indicate the activation of the already shared interference coordination pattern (performed for the first UE) in the second handover request 408 and the second handover request acknowledgement 409. For example, the source base station may transmit an indication to the target base station in the second handover request 408 to inform the target base station that the first interference coordination pattern transmitted in the first handover request 402 is activated, i.e. interference coordination is applied. The target base station may transmit an indication to the source base station in the second handover request acknowledgement 409 to inform the source base station that the second interference coordination pattern transmitted in the first handover request acknowledgement 403 is activated. In another exemplary embodiment, the target base station may use some other message instead of the handover success message to instruct the first base station to deactivate the first interference coordination pattern. For example, a next generation radio access network (NG-RAN) node configuration update message may be used to convey the instructions to deactivate the first interference coordination pattern.

In another exemplary embodiment, the source base station may transmit an indication (or request) to the target base station in the second handover request 408 to activate the second interference coordination pattern transmitted in the first handover request acknowledgement 403. The target base station may transmit an indication (or request) to the source base station in the second handover request acknowledgement 409 to activate the first interference coordination pattern transmitted in the first handover request 402.

Figure 5:
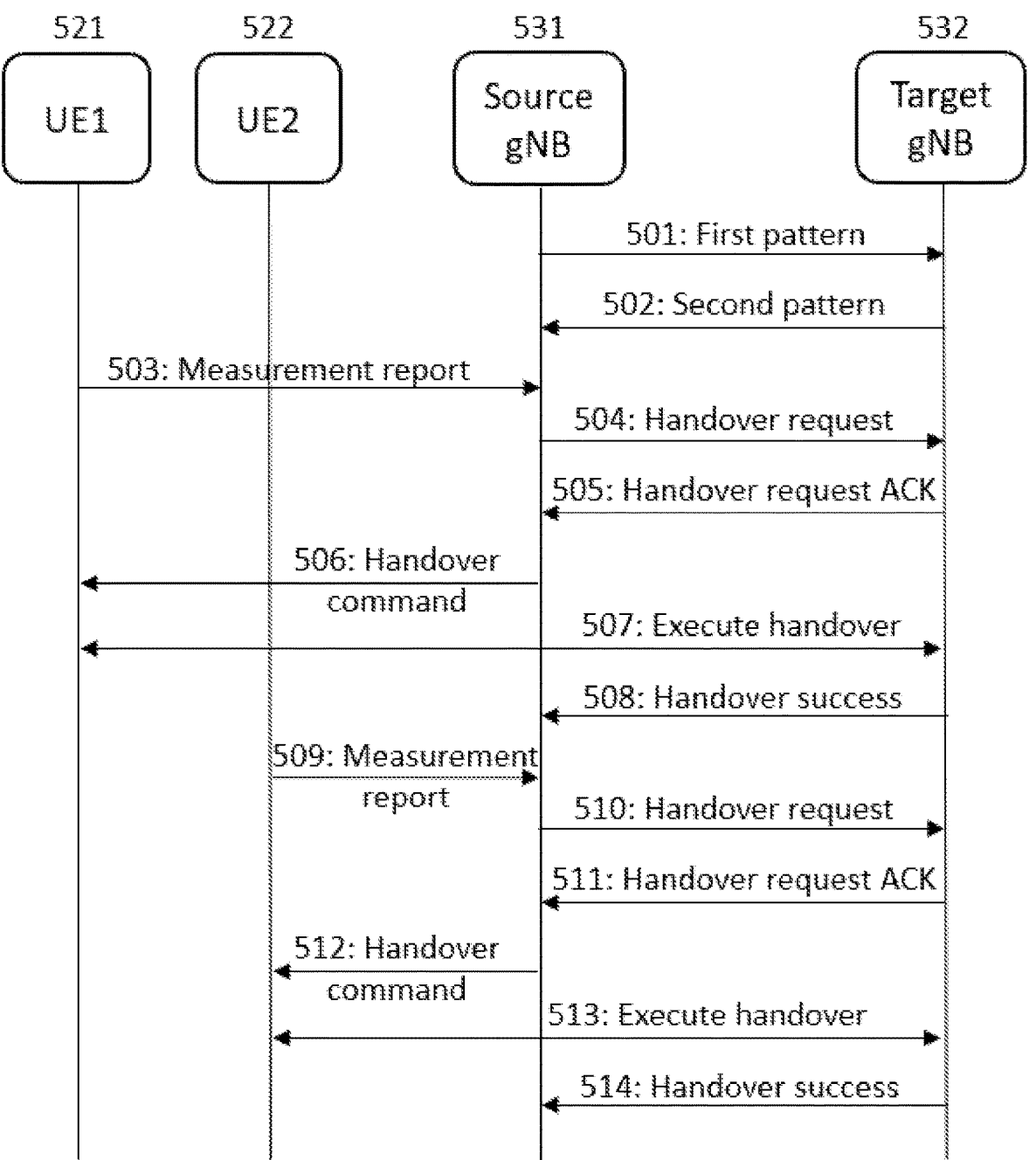

FIG. 5 illustrates a signaling diagram according to another exemplary embodiment. In this exemplary embodiment, the source and target cell may exchange the interference coordination patterns over the Xn interface without activating the patterns yet at that point. In this case, the interference coordination patterns may be exchanged, for example, by using Xn signaling that is independent from the handover procedure. The activation of these patterns may then be indicated by the source cell and/or the target cell during the handover preparation whenever a UE is to be handed over.

Referring to FIG. 5, a source base station 531 transmits 501 a first interference coordination pattern of the source base station to a target base station 532. The target base station transmits 502 a second interference coordination pattern of the target base station to the source base station. The transmission 501 of the first interference coordination pattern and the transmission 502 of the second interference coordination pattern can be done for example as part of an Xn setup procedure or an NG-RAN node configuration update message. In other words, the first interference coordination pattern and/or the second interference coordination pattern may be comprised in an Xn setup message or in a node configuration update message. It should be noted that the interference coordination patterns are not yet activated at this point. The source base station and the target base station may be gNBs, for example.

A first UE 521 transmits 503 a first measurement report to the source base station, i.e. the current serving cell of the first UE. The source base station may also be referred to as a first base station or a source cell herein. The first measurement report may comprise, for example, a set of signal strength measurements of the serving cell and one or more neighboring cells measured by the first UE. The set of measurements may comprise, for example, SNR, SINR, RSRP, and/or RSRQ.

Once the source base station receives the first measurement report from the first UE, the source base station decides, based at least partly on the first measurement report, to initiate a handover for handing over the first UE from the source base station to the target base station, i.e. a neighbor cell. The target base station may also be referred to as a second base station or a target cell herein.

The source base station transmits 504 a first handover request to the target base station, wherein the first handover request may comprise an indication to the target base station that the first interference coordination pattern at the source base station is activated, as well as information for preparing the handover of the first UE at the target base station. The target base station transmits 505 a first handover request acknowledgement message to the source base station to accept the handover. The first handover request acknowledgement message may comprise at least a first handover command to be sent to the first UE, as well as an indication to the source base station that the second interference coordination pattern at the target base station is activated.

Alternatively, the source base station may transmit an indication (or request) to the target base station in the first handover request 504 to activate the second interference coordination pattern at the target base station. The target base station may transmit an indication (or request) to the source base station in the first handover request acknowledgement 505 to activate the first interference coordination pattern at the source base station.

The source base station transmits 506 the first handover command to the first UE as an RRC reconfiguration message comprising information, such as the target cell identifier, for accessing the target base station. The first handover command is transmitted based at least partly on the first interference coordination pattern and/or the second interference coordination pattern.

A handover is then executed 507 to hand over the first UE from the source base station to the target base station. The handover execution 507 may be performed, for example, according to the baseline handover procedure described above with reference to FIG. 2, or according to the DAPS handover procedure described above with reference to FIG. 3.

In case of DAPS handover, the user plane data originating from the source cell is transmitted based at least partly on the first interference coordination pattern and/or the second interference coordination pattern.

Similarly, as part of the handover execution 507, the PRACH preamble and the RAR are transmitted and received, respectively, by the first UE based at least partly on the first interference coordination pattern and/or the second interference coordination pattern.

The target base station transmits 508 a first handover success message to the source base station to indicate the successful handover execution for the first UE, and to instruct the source base station to deactivate at least the first interference coordination pattern.

A second UE 522 transmits 509 a second measurement report to the source base station, i.e. the current serving cell of the second UE. The second measurement report may comprise, for example, a set of signal strength measurements of the serving cell and one or more neighboring cells measured by the second UE. The set of measurements may comprise, for example, SNR, SINR, RSRP, and/or RSRQ.

Once the source base station receives the second measurement report from the second UE, the source base station decides, based at least partly on the second measurement report, to initiate a handover for handing over the second UE from the source base station to the target base station. The source base station transmits 510 a second handover request to the target base station, wherein the second handover request comprises an indication that the first interference coordination pattern at the source base station is activated, as well as information for preparing the handover of the second UE at the target base station. The target base station transmits 511 a second handover request acknowledgement message to the source base station to accept the handover. The second handover request acknowledgement message comprises at least a second handover command to be sent to the second UE, as well as an indication that the second interference coordination pattern at the target base station is activated.

Alternatively, the source base station may transmit an indication (or request) to the target base station in the second handover request 510 to activate the second interference coordination pattern at the target base station. The target base station may transmit an indication (or request) to the source base station in the second handover request acknowledgement 511 to activate the first interference coordination pattern at the source base station.

The source base station transmits 512 the second handover command to the second UE as an RRC reconfiguration message comprising information, such as the target cell identifier, for accessing the target cell. The second handover command is transmitted based at least partly on the first interference coordination pattern and the second interference coordination pattern.

A handover is then executed 513 to hand over the second UE from the source base station to the target base station. The handover 513 may be performed, for example, according to the baseline handover procedure described above with reference to FIG. 2, or according to the DAPS handover procedure described above with reference to FIG. 3.

In case of DAPS handover, the user plane data originating from the source cell is transmitted based at least partly on the first interference coordination pattern and/or the second interference coordination pattern.

Similarly, as part of the handover execution in step 513, the PRACH preamble and the RAR are transmitted and received, respectively, by the second UE based at least partly on the first interference coordination pattern and/or the second interference coordination pattern.

The target base station transmits 514 a second handover success message to the source base station to indicate the successful handover execution for the second UE.

The functions and/or blocks described above by means of FIGS. 2-5 are in no absolute chronological order, and some of them may be performed simultaneously or in an order differing from the described one. Other functions and/or blocks may also be executed between them or within them.

It should be noted that some exemplary embodiments may be applied to any type of handover, such as a legacy baseline handover for LTE or NR, a DAPS handover for LTE or NR, or a conditional handover for LTE or NR.

In some exemplary embodiments, for example for baseline handover or DAPS handover, after the transmission of the handover command to the UE (and receiving a low layer ACK), the source base station may transmit a new message to the target base station to deactivate the second interference coordination pattern.

In some exemplary embodiments, for example for baseline handover or DAPS handover, the source base station may decide to not provide its interference coordination pattern to the target base station, if it does not want to protect the RACH response. In this case, just the interference coordination pattern of the target base station may be provided via the signaling.

In another exemplary embodiment, the source base station may propose to the target base station an interference coordination pattern to be applied at the target base station. In other words, the target base station may obtain the interference coordination pattern of the target base station from the source base station. In another exemplary embodiment, the target base station may deactivate its interference coordination pattern configuration autonomously after receiving the contention-free random access (CFRA) preamble from the UE (after the handover command has already been received by the UE).

In another exemplary embodiment, the target base station and the source base station may deactivate the interference coordination after delivering the RAR (after the handover command and the RAR have already been protected). Herein, the target base station may transmit a message to the source base station to deactivate its interference coordination pattern.

In another exemplary embodiment, the source base station and/or the target base station may not send the signaling for deactivating the interference coordination at the other base station, when there is still a pending handover for another UE. In other words, the source base station and/or the target base station may instruct the other base station to deactivate the interference coordination in the absence of further UEs eligible for a handover, i.e. if there are no pending handovers for one or more additional UEs.

FIG. 6 illustrates a flow chart according to another exemplary embodiment. A first apparatus receives 601, from a second apparatus, a first interference coordination pattern of the second apparatus. The first apparatus transmits 602, to the second apparatus, a first handover request for handing over a first UE from the first apparatus to the second apparatus. The first apparatus receives 603, from the second apparatus, a first handover request acknowledgement comprising at least a first handover command. The first apparatus transmits 604, to the first UE, the first handover command based at least partly on the first interference coordination pattern of the second apparatus. The first apparatus may be a source base station (i.e. the original serving cell of the first UE), or an apparatus comprised in the source base station. The second apparatus may be a target base station (i.e. the target cell of the handover), or an apparatus comprised in the target base station.

FIG. 7 illustrates a flow chart according to another exemplary embodiment. A second apparatus receives 701, from a first apparatus, a first interference coordination pattern of the first apparatus. The second apparatus receives 702, from the first apparatus, a first handover request for handing over a first UE from the first apparatus to the second apparatus. The second apparatus selects a RACH configuration, i.e. a configuration of the RACH occasions where the first UE is allowed to transmit the PRACH preamble to the second apparatus, based at least partly on the first interference coordination pattern of the first apparatus, such that the RACH occasions occur in time instants and/or frequency chunks, where the first apparatus is not scheduling its UEs for uplink transmission. This may reduce the UE uplink interference at the second apparatus, increasing the likelihood that the PRACH preamble is received successfully. The second apparatus transmits 703, to the first apparatus, a first handover request acknowledgement comprising at least a first handover command. The RACH configuration may be comprised for example in the first handover command, which the first apparatus in turn transmits to the first UE. The second apparatus receives 704, from the first UE, a PRACH preamble based at least partly on the first interference coordination pattern of the first apparatus. The second apparatus transmits 705, to the first UE, a RAR based at least partly on the first interference coordination pattern of the first apparatus. The first apparatus may be a source base station (i.e. the original serving cell of the first UE), or an apparatus comprised in the source base station. The second apparatus may be a target base station (i.e. the target cell of the handover), or an apparatus comprised in the target base station.

Figure 8:
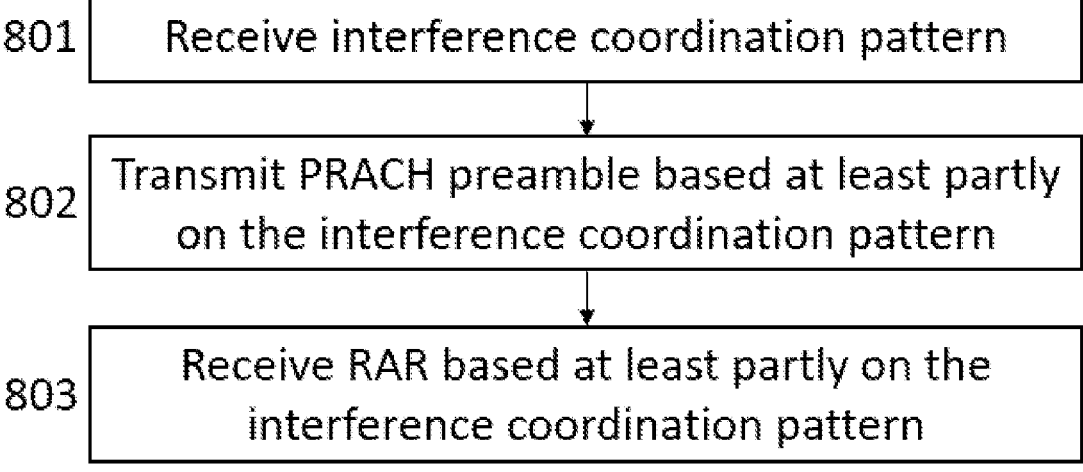

FIG. 8 illustrates a flow chart according to another exemplary embodiment. A third apparatus receives 801, from a first apparatus, a first interference coordination pattern of the first apparatus. The first interference coordination pattern may be received, for example, in an RRC reconfiguration message. As another example, the first interference coordination pattern may be comprised in the handover command that is generated by a second apparatus and transmitted to the third apparatus by the first apparatus, i.e., the first apparatus may signal the first interference coordination pattern to the second apparatus, which in turn may include it in the handover command. The third apparatus transmits 802, to the second apparatus, a PRACH preamble based at least partly on the first interference coordination pattern of the first apparatus. In other words, the third apparatus may select a RACH occasion of the second apparatus based at least partly on the first interference coordination pattern received from the first apparatus. That is, when performing the random access to the second apparatus, the third apparatus may select a RACH occasion when the first apparatus is not scheduling its UEs for uplink transmission, thus reducing the UE uplink interference at the second apparatus, and increasing the likelihood that the PRACH preamble is received successfully by the second apparatus. The third apparatus receives 803, from the second apparatus, a RAR based at least partly on the first interference coordination pattern of the first apparatus. The third apparatus may be a UE or an apparatus comprised in the UE. The first apparatus may be a source base station (i.e. the original serving cell of the UE), or an apparatus comprised in the source base station. The second apparatus may be a target base station (i.e. the target cell of the handover), or an apparatus comprised in the target base station.

In some exemplary embodiments, the first apparatus may determine the interference coordination pattern of the first apparatus for example blindly or based on the RACH configuration of the second apparatus, i.e. the configuration of RACH occasions where the PRACH preamble can be transmitted by the first UE to the second apparatus. In case of the latter option (using the RACH configuration), the first apparatus may, for example, a) decode the handover command (signaled as part of the handover request acknowledgment message) to check the RACH configuration, or b) receive the RACH configuration of the second apparatus separately from the handover command.

The functions and/or blocks described above by means of FIGS. 6-8 are in no absolute chronological order, and some of them may be performed simultaneously or in an order differing from the described one. Other functions and/or blocks may also be executed between them or within them.

Some exemplary embodiments may apply a split CU-DU base station architecture, wherein the RRC and PDCP layer of the gNB are hosted in the CU, and the lower layers, i.e. the physical (PHY), medium access control (MAC) and radio link control (RLC) layers, are hosted in the DU. In some exemplary embodiments, the first apparatus mentioned above with reference to FIGS. 6-8 may be comprised in a first DU, and the second apparatus mentioned above with reference to FIGS. 6-8 may be comprised in a second DU. The first DU and the second DU may both be associated with a single CU, or the first DU and the second DU may be associated with different CUs.

In an exemplary embodiment, upon receiving a handover request for a UE, the CU may transmit a signaling message to the DU comprising the interference coordination pattern to be applied by the DU.

In another exemplary embodiment, the CU may transmit a signaling message to the DU for activating the last interference coordination pattern received from the CU. This may be useful if a single interference coordination pattern is re-used for multiple UEs.

In another exemplary embodiment, the CU may transmit a signaling message to the DU comprising the interference coordination pattern with a conditional activation. In other words, the pre-configured interference coordination pattern may not be activated by the DU until it receives an activation indication from the CU, which may be sent when the handover preparation is triggered by the network. After the handover execution is completed (for example by the CU receiving a handover success message), the CU informs the DU to deactivate the interference coordination.

A technical advantage provided by some exemplary embodiments is that they may provide improved mobility robustness and reduced interruption time with minimal waste of radio resources and signaling overhead. In some exemplary embodiments, the interference coordination is not activated until there is a UE performing a handover, i.e. the interference coordination is deactivated in time periods where no handover is triggered. Furthermore, the interference coordination mechanism may be integrated into the handover procedure, which may reduce signaling and latency.

Figure 9:
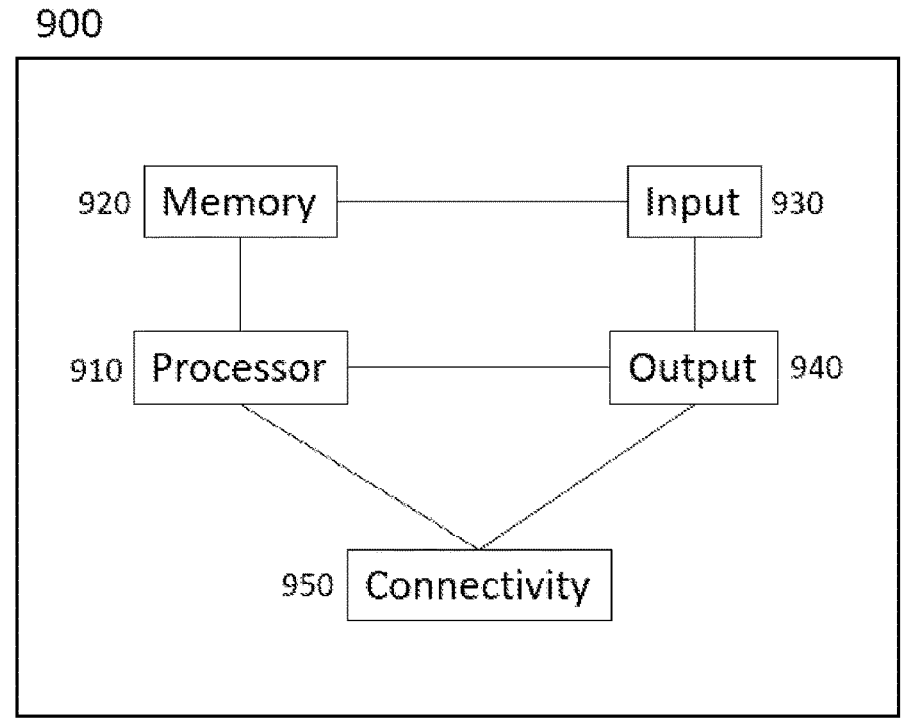
FIGS. 9 and 10 illustrate apparatuses according to some exemplary embodiments.

FIG. 9 illustrates an apparatus 900, which may be an apparatus such as, or comprised in, a terminal device, according to an exemplary embodiment. A terminal device may also be referred to as a UE or user equipment herein. The apparatus 900 comprises a processor 910. The processor 910 interprets computer program instructions and processes data. The processor 910 may comprise one or more programmable processors. The processor 910 may comprise programmable hardware with embedded firmware and may, alternatively or additionally, comprise one or more application-specific integrated circuits (ASICs).

The processor 910 is coupled to a memory 920. The processor is configured to read and write data to and from the memory 920. The memory 920 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 920 stores computer readable instructions that are executed by the processor 910. For example, non-volatile memory stores the computer readable instructions and the processor 910 executes the instructions using volatile memory for temporary storage of data and/or instructions.

The computer readable instructions may have been pre-stored to the memory 920 or, alternatively or additionally, they may be received, by the apparatus, via an electromagnetic carrier signal and/or may be copied from a physical entity such as a computer program product. Execution of the computer readable instructions causes the apparatus 900 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 900 may further comprise, or be connected to, an input unit 930. The input unit 930 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 930 may comprise an interface to which external devices may connect to.

The apparatus 900 may also comprise an output unit 940. The output unit may comprise or be connected to one or more displays capable of rendering visual content, such as a light emitting diode (LED) display, a liquid crystal display (LCD) and/or a liquid crystal on silicon (LCoS) display. The output unit 940 may further comprise one or more audio outputs. The one or more audio outputs may be for example loudspeakers.

The apparatus 900 further comprises a connectivity unit 950. The connectivity unit 950 enables wireless connectivity to one or more external devices. The connectivity unit 950 comprises at least one transmitter and at least one receiver that may be integrated to the apparatus 900 or that the apparatus 900 may be connected to. The at least one transmitter comprises at least one transmission antenna, and the at least one receiver comprises at least one receiving antenna. The connectivity unit 950 may comprise an integrated circuit or a set of integrated circuits that provide the wireless communication capability for the apparatus 900. Alternatively, the wireless connectivity may be a hardwired application-specific integrated circuit (ASIC). The connectivity unit 950 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 900 may further comprise various components not illustrated in FIG. 9. The various components may be hardware components and/or software components.

Figure 10:
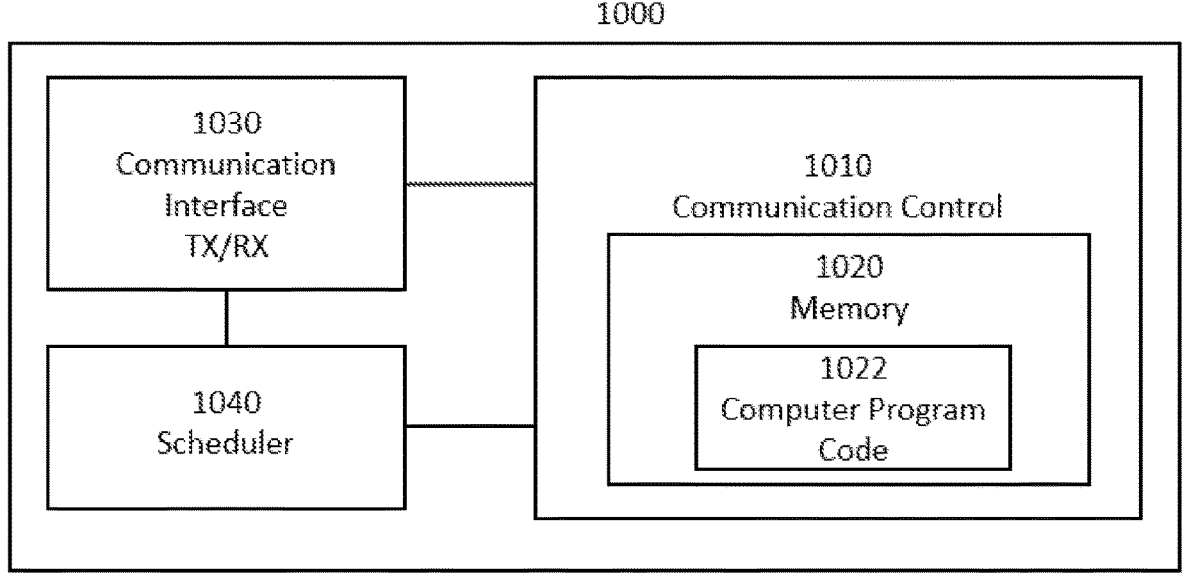

The apparatus 1000 of FIG. 10 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 1000 may be an electronic device comprising one or more electronic circuitries. The apparatus 1000 may comprise a communication control circuitry 1010 such as at least one processor, and at least one memory 1020 including a computer program code (software) 1022 wherein the at least one memory and the computer program code (soft-ware) 1022 are configured, with the at least one processor, to cause the apparatus 1000 to carry out some of the exemplary embodiments described above.

The memory 1020 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1000 may further comprise a communication interface 1030 comprising hardware and/or software for realizing communication connectivity according to one or more communication protocols. The communication interface 1030 comprises at least one transmitter (TX) and at least one receiver (RX) that may be integrated to the apparatus 1000 or that the apparatus 1000 may be connected to. The communication interface 1030 provides the apparatus with radio communication capabilities to communicate in the cellular communication system. The communication interface may, for example, provide a radio interface to terminal devices. The apparatus 1000 may further comprise another interface towards a core network such as the network coordinator apparatus and/or to the access nodes of the cellular communication system. The apparatus 1000 may further comprise a scheduler 1040 that is configured to allocate resources.

As used in this application, the term "circuitry" may refer to one or more or all of the following:

a. hardware-only circuit implementations (such as implementations in only analog and/or digital circuitry) and b. combinations of hardware circuits and software, such as (as applicable):

i. a combination of analog and/or digital hardware circuit(s) with software/firmware and ii. any portions of hardware processor(s) with software (including digital signal processor(s)), software, and memory(ies) that work together to cause an apparatus, such as a mobile phone, to perform various functions) and c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

LIST OF ABBREVIATIONS

4G: fourth generation
5G: fifth generation
ACK: acknowledgement
ADC: analog-to-digital converter
AMF: access and mobility management function
ASIC: application-specific integrated circuit
BBU: baseband unit
CFRA: contention-free random access
CN: core network
CPS: cyber-physical system
CQI: channel quality indicator
CSSP: customer-specific standard product
CU: central unit
DAC: digital-to-analog converter
DAPS: dual active protocol stack
dB: decibel
DFE: digital front end
DL: downlink
DRAM: dynamic random-access memory
DSP: digital signal processor
DSPD: digital signal processing device
DU: distributed unit
EEPROM: electronically erasable programmable read-only memory
FPGA: field programmable gate array
GEO: geostationary earth orbit
GPU: graphics processing unit
gNB: next generation nodeB
HNB-GW: home node B gateway
IMS: internet protocol multimedia subsystem
IOT: internet of things
L1: Layer 1
L2: Layer 2
L3: Layer 3
LCD: liquid crystal display
LCoS: liquid crystal on silicon
LED: light emitting diode LEO: low earth orbit
LTE: long term evolution
LTE-A: long term evolution advanced
M2M: machine-to-machine
MAC: medium access control
MANET: mobile ad-hod network
MBB: make-before-break
MEC: multi-access edge computing
MIMO: multiple input and multiple output
MME: mobility management entity
mMTC: massive machine-type communications
NGC: next generation core
NG-RAN: next generation radio access network
NR: new radio
NVF: network function virtualization
PCS: personal communications services
PDA: personal digital assistant
PDCP: packet data convergence protocol
P-GW: packet data network gateway
PHY: physical
PLD: programmable logic device
PRACH: physical random access channel
PROM: programmable read-only memory
RACH: random access channel
RAM: random-access memory
RAN: radio access network
RAP: radio access point
RAR: random access response
RAT: radio access technology
RI: radio interface
RLC: radio link control
ROM: read-only memory
RRC: radio resource control
RSRP: reference signal received power
RSRQ: reference signal received quality
RU: radio unit
RX: receiver
SDN: software defined networking
SDRAM: synchronous dynamic random-access memory
SDU: service data unit
S-GW: serving gateway
SIM: subscriber identification module
SINR: signal-to-interference-plus-noise ratio
SN: sequence number
SNR: signal-to-noise ratio
SoC: system-on-a-chip
TRX: transceiver
TX: transmitter
UE: user equipment
UL: uplink
UMTS: universal mobile telecommunications system
UPF: user plane function
UTRAN: UMTS radio access network
UWB: ultra-wideband
vCU: virtualized central unit
vDU: virtualized distributed unit
WCDMA: wideband code division multiple access
WiMAX: worldwide interoperability for microwave access
WLAN: wireless local area network

The invention claimed is:
1. A method comprising:
transmitting, by a first apparatus, to a second apparatus, a first interference coordination pattern of the first apparatus;

transmitting, by the first apparatus, to the second apparatus, a first handover request for handing over a first terminal device from the first apparatus to the second apparatus;

receiving, by the first apparatus, from the second apparatus, a first handover request acknowledgement comprising at least a first handover command; and transmitting, by the first apparatus, to the first terminal device, the first handover command based at least partly on the first interference coordination pattern of the first apparatus.

2. A first apparatus comprising at least one processor, and at least one memory including computer program code, wherein the at least one memory and the computer program code are configured, with the at least one processor, to cause the first apparatus to:

transmit, to a second apparatus, a first interference coordination pattern of the second apparatus;

transmit, to the second apparatus, a first handover request for handing over a first terminal device from the first apparatus to the second apparatus;

receive, from the second apparatus, a first handover request acknowledgement comprising at least a first handover command; and transmit, to the first terminal device, the first handover command based at least partly on the first interference coordination pattern of the first apparatus.

3. A second apparatus comprising at least one processor, and at least one memory including computer program code, wherein the at least one memory and the computer program code are configured, with the at least one processor, to cause the second apparatus to:

receive, from a first apparatus, a first interference coordination pattern of the first apparatus;

receive, from the first apparatus, a first handover request for handing over a first terminal device from the first apparatus to the second apparatus;

transmit, to the first apparatus, a first handover request acknowledgement comprising at least a first handover command; and transmit, to the first terminal device, a random access response based at least partly on the first interference coordination pattern of the first apparatus.

4. A third apparatus comprising at least one processor, and at least one memory including computer program code, wherein the at least one memory and the computer program code are configured, with the at least one processor, to cause the third apparatus to:

transmit, to a second apparatus, a physical random access channel preamble based at least partly on a first interference coordination pattern of a first apparatus, wherein the third apparatus is comprised in a terminal device.

5. The first apparatus according to claim 2, wherein the first interference coordination pattern of the second apparatus is comprised in the first handover request acknowledgement or in an Xn setup message or in a node configuration update message.

6. The first apparatus according to claim 2, wherein the first handover request further comprises a request to activate the first interference coordination pattern of the second apparatus.

7. The first apparatus according to claim 2, wherein the first handover request further comprises a request to provide the first interference coordination pattern of the second apparatus to the first apparatus.

8. The first apparatus according to claim 2, wherein the first handover request acknowledgement further comprises an indication that at least the first interference coordination pattern of the second apparatus is activated.

9. The first apparatus according to claim 2, wherein the at least one memory and the computer program code are further configured, with the at least one processor, to cause the first apparatus to: transmit, to the second apparatus, a second interference coordination pattern of the first apparatus.

10. The first apparatus according to claim 8, wherein the first handover request acknowledgement further comprises an indication to activate at least the second interference coordination pattern at the first apparatus.

11. The first apparatus according to claim 8, wherein the at least one memory and the computer program code are further configured, with the at least one processor, to cause the first apparatus to:

receive, from the second apparatus, a message instructing the first apparatus to deactivate at least the second interference coordination pattern of the first apparatus.

12. The first apparatus according to claim 11, wherein the at least one memory and the computer program code are further configured, with the at least one processor, to cause the first apparatus to:

transmit, to the second apparatus, a second handover request for handing over a second terminal device from the first apparatus to the second apparatus;

receive, from the second apparatus, a second handover request acknowledgement comprising at least a second handover command; and transmit, to the second terminal device, the second handover command based at least partly on the first interference coordination pattern of the second apparatus.

13. The first apparatus according to claim 12, wherein the at least one memory and the computer program code are further configured, with the at least one processor, to cause the first apparatus to:

transmit, to the first terminal device, user plane data originating from the first apparatus during a dual active protocol stack handover of the first terminal device from the first apparatus to the second apparatus, wherein the user plane data is transmitted based at least partly on the first interference coordination pattern of the second apparatus.

14. The second apparatus according to claim 3, wherein the at least one memory and the computer program code are further configured, with the at least one processor, to cause the second apparatus to:

receive, from the first terminal device, a first message indicating that the first terminal device is handed over from the first apparatus to the second apparatus;

transmit, to the first apparatus, a second message instructing the first apparatus to deactivate at least the first interference coordination pattern, if there is no pending handover associated with one or more third terminal devices.

15. The second apparatus according to claim 3, wherein the at least one memory and the computer program code are further configured, with the at least one processor, to cause the second apparatus to:

transmit, to the first apparatus, a second interference coordination pattern of the second apparatus.

16. The second apparatus according to claim 15, wherein at least the second interference coordination pattern is deactivated upon receiving a contention-free random access preamble from the first terminal device, or upon transmitting the random access response to the first terminal device.

17. The third apparatus according to claim 4, wherein the at least one memory and the computer program code are further configured, with the at least one processor, to cause the third apparatus to:

receive, from the second apparatus, a random access response based at least partly on the first interference coordination pattern of the first apparatus.

18. The third apparatus according to claim 4, wherein the at least one memory and the computer program code are further configured, with the at least one processor, to cause the third apparatus to:

receive, from the first apparatus, the first interference coordination pattern in a radio resource control reconfiguration message or in a handover command.

\* \* \* \* \*